(12) United States Patent
Hosey (10) Patent No.: US 9,330,131 B2
(45) Date of Patent: May 3, 2016

(54) CONFLICT MARKUP TOLERANT INPUT STREAM

(71) Applicant: The MathWorks, Inc., Natick, MA (US)

(72) Inventor: Timothy Hosey, Longstanton (GB)

(73) Assignee: The MathWorks, Inc., Natick, MA (US)

( * ) Notice: Subject to any disclaimer, the term of this patent is extended or adjusted under 35 U.S.C. 154(b) by 138 days.

(21) Appl. No.: 13/765,055

(22) Filed: Feb. 12, 2013

(65) Prior Publication Data

US 2014/0149361 A1 May 29, 2014

Related U.S. Application Data

(60) Provisional application No. 61/730,770, filed on Nov. 28, 2012.

(51) Int. Cl.
*G06F 17/30* (2006.01)
*G06F 9/44* (2006.01)

(52) U.S. Cl.
CPC .......... *G06F 17/30371* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 6,240,414 | B1 * | 5/2001 | Beizer et al. | |
| 8,156,459 | B1 * | 4/2012 | Ou et al. | 716/107 |
| 2009/0271696 | A1 * | 10/2009 | Bailor et al. | 715/229 |
| 2011/0218964 | A1 * | 9/2011 | Hagan et al. | 707/626 |

OTHER PUBLICATIONS

MacKenzie et al., "Comparing and Merging Files for Diffutils 3.2 and patch 2.5.4", Free Software Foundation, Aug. 15, 2011, retrieved on Sep. 3, 2014 using the Internet Archive WayBack Machine from: http://web.archive.org/web/20111025153542/http://www.gnu.org/software/diffutils/manual/diffutils.pdf.*

Notification of Transmittal of the International Search Report and the Written Opinion of the International Searching Authority, or the Declaration, corresponding to PCT/US2013/072318, mailed Mar. 31, 2014, 11 pages.

Eclipse Contributors, "Eclipse Workbench User Guide, Juno Release (excerpt)", Jun. 27, 2012, 76 pages, XP055109141.

Eclipse Contributors, "Eclipse EGit Documentation, June Release", Jun. 27, 2012, 82 pages, XP055109142.

Miro Jurisic, "Understanding CVS", Nov. 18, 2003, 8 pages, XP055109121.

* cited by examiner

*Primary Examiner* — Alex Gofman
*Assistant Examiner* — Umar Mian
(74) *Attorney, Agent, or Firm* — Harrity & Harrity, LLP (57) ABSTRACT

A device receives a conflicted file, with a structured data format, that includes a conflict marker that does not comply with the structured data format. The conflict marker identifies first edited information and second edited information included in the conflicted file. The first edited information and the second edited information comply with the structured data format, and include information that has been modified in different versions of a shared file to create the conflicted file. The device detects that the conflicted file includes the conflict marker, and identifies, based on the detected conflict marker, the first edited information and the second edited information. The device determines that at least one of the first edited information or the second edited information is to be provided to the application for processing, and provides, based on the determining, the first edited information or the second edited information to the application for processing.

20 Claims, 10 Drawing Sheets

```
<?xml version="1.0" encoding="utf-8"?>
<project MetadataType="monolithic">
  <Categories Location="Root">
<<<<<<< .mine
  <Category Location="c9765fcc-8ff5-4c78-bbee-060adcef7f43">
    <Info DataType="String" Name="Engineers" ReadOnly="0" SingleValued="0"/>
    <Label Location="16dae770-f533-4373-a962-caf3d49c3a52">
      <Info Name="Bob" ReadOnly="WRITABLE"/>
    </Label>
    <Label Location="922e1455-7661-4e09-8196-c3003b9de87c">
      <Info Name="Jim" ReadOnly="WRITABLE"/>
    </Label>
  </Category>
=======
  <Category Location="f3bd5a25-959c-46e5-be23-8dc0209c2a6c">
    <Info DataType="Double" Name="People" ReadOnly="0" SingleValued="0"/>
    <Label Location="baa0f461-b064-40ec-8004-85f1444a72ad">
      <Info Name="Bob" ReadOnly="WRITABLE"/>
    </Label>
    <Label Location="6dca9333-160f-4c86-a99e-9748230c0a44">
      <Info Name="Jim" ReadOnly="WRITABLE"/>
    </Label>
  </Category>
>>>>>>> .r4
  </Categories>
</project>
```

FIG. 7A

```xml
<?xml version="1.0" encoding="utf-8"?>
<project MetadataType="monolithic">
<Categories Location="Root">
<Category Location="c9765fcc-8ff5-4c78-bbee-060adcef7f43">
<Info DataType="String" Name="Engineers" ReadOnly="0" SingleValued="0"/>
<Label Location="16dae770-f533-4373-a962-caf3d49c3a52">
<Info Name="Bob" ReadOnly="WRITABLE"/>
</Label>
<Label Location="922e1455-7661-4e09-8196-c3003b9de87c">
<Info Name="Jim" ReadOnly="WRITABLE"/>
</Label>
</Category>
</Categories>
</project>
```

FIG. 7B

```xml
<?xml version="1.0" encoding="utf-8"?>
<project MetadataType="monolithic">
  <Categories Location="Root">
    <Category Location="f3bd5a25-959c-46e5-be23-8dc0209c2a6c">
      <Info DataType="Double" Name="People" ReadOnly="0" SingleValued="0"/>
      <Label Location="baa0f461-b064-40ec-8004-85f1444a72ad">
        <Info Name="Bob" ReadOnly="WRITABLE"/>
      </Label>
      <Label Location="6dca9333-160f-4c86-a99e-9748230c0a44">
        <Info Name="Jim" ReadOnly="WRITABLE"/>
      </Label>
    </Category>
  </Categories>
</project>
```

FIG. 7C

CONFLICT MARKUP TOLERANT INPUT STREAM

RELATED APPLICATION

This application claims priority under 35 U.S.C. §119 based on U.S. Provisional Patent Application No. 61/730,770, filed on Nov. 28, 2012, the content of which is incorporated by reference herein in its entirety.

DETAILED DESCRIPTION

The following detailed description of example implementations refers to the accompanying drawings. The same reference numbers in different drawings may identify the same or similar elements.

When multiple users edit a shared file, the user edits may conflict with one another. For example, a first user, using a first client device, may open a shared file obtained from a server, and may edit a portion of the shared file. Before the first user saves the shared file to the server, a second user, using a second client device, may open the shared file obtained from the server, and may edit the same portion of the shared file in a different manner than the first user. Both users may then save the shared file to the server. This may happen, for example, when the users are members of a programming team responsible for editing program code for a software program. A shared repository may store revisions to a shared file that includes the program code. The shared file may be opened on a client device of a user, who may make local modifications to the program code.

A source control tool that manages the shared file may determine that the users have edited the same portion of the file in a different manner, and may mark up the file using one or more conflict markers. The conflict markers may indicate portions of the file that are the same after each user's edits, may indicate portions of the file that have been edited by the first user (which are different from the edits by the second user), and may indicate portions of the file that have been edited by the second user (which are different from the edits by the first user). This may happen, for example, when a local version of a program code file does not match a latest version of a program code file stored in a shared repository.

When an application attempts to process the shared file that includes a conflict marker, the processing may fail because the application is unable to interpret or execute the marked-up portions of the file. An application, as used herein, may refer to a program capable of saving, writing, and/or exporting application data and then loading, reading, importing, and/or accessing that application data. The application may structure the application data in a particular format, and may be incapable of accessing information that does not comply with this format, such as information that has been marked up using a conflict marker. When the application attempts to process a file that includes a conflict marker, the processing may fail because the file with the conflict marker does not comply with the application data format. This may lead to corruption of the file and/or a loss of data. Implementations described herein may assist an application in correctly processing a file that includes a conflict marker that does not comply with the application's structured data format.

Figure 1A:
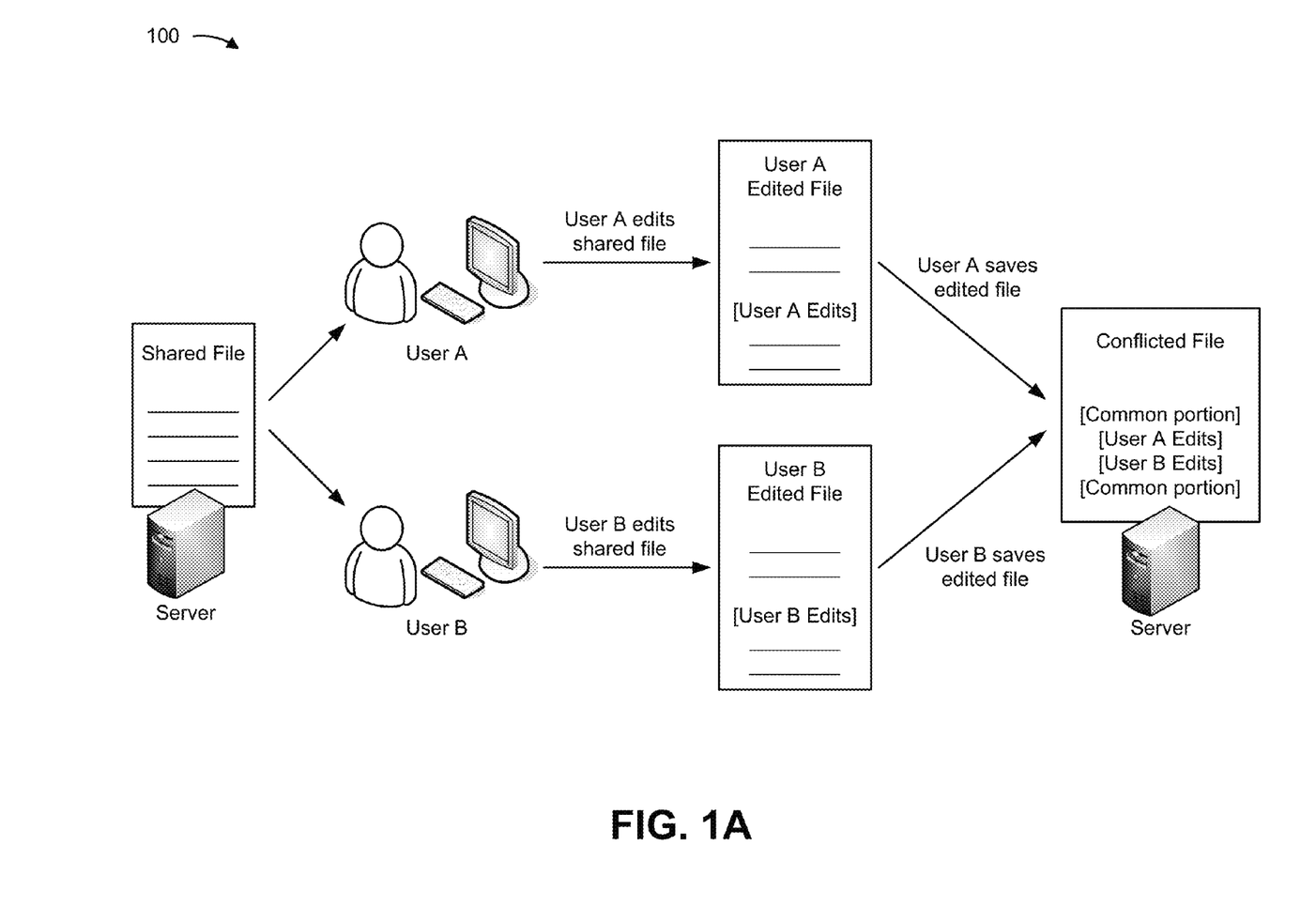
FIGS. 1A and 1B are diagrams of an overview of an example implementation described herein.

FIG. 1A is a diagram of an overview of an example implementation 100 described herein. As shown in FIG. 1A, a shared file, stored on a server, may be opened for editing by multiple users, such as User A and User B. User A may edit the shared file to create an edited version of the shared file that includes User A's edits. Similarly, User B may edit the shared file to create an edited version of the shared file that includes User B's edits. In some implementations, User A and User B may edit the same portion of the file in a different manner. User A and User B may save the edited files to the server. A source control tool may create a conflicted file based on User A's edits and User B's edits. For example, the source control tool may insert one or more conflict markers into the conflicted file to identify User A's edits, User B's edits, and common portions of the conflicted file that are the same after both users have saved the edited files.

Figure 1B:
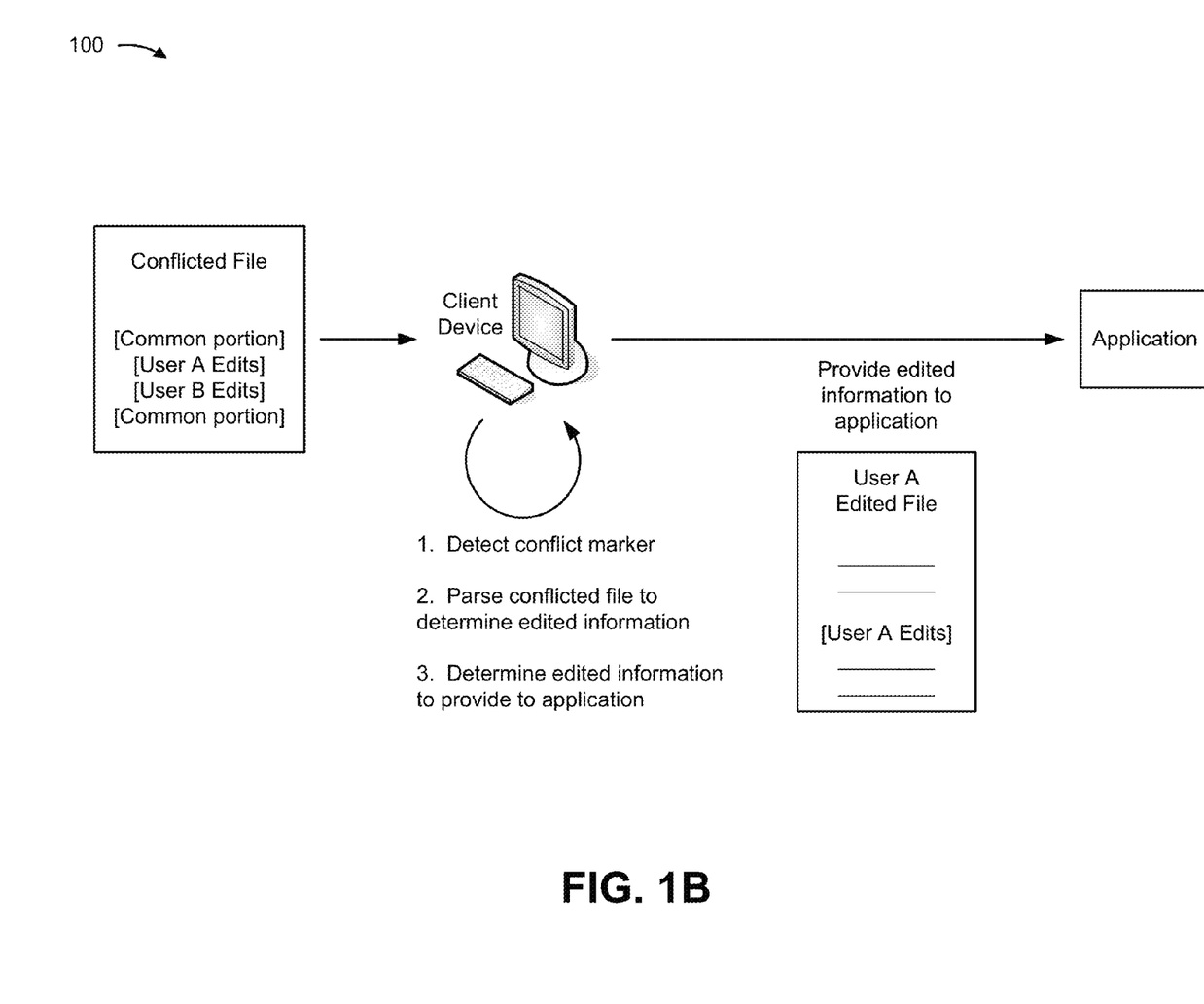

As shown in FIG. 1B, a client device may create or receive the conflicted file. An application running on the client device may be unable to process the conflicted file with the conflict markers, so the client device may detect that the conflicted file includes a conflict marker, may parse the conflicted file to determine edited information included in the conflicted file (e.g., User A's edits and User B's edits), and may determine edited information to provide to the application. For example, the client device may present, to a user, User A's edited information and User B's edited information, may receive a user selection of User A's edited information, and may provide User A's edited information to the application, without the conflict markers. The application may correctly process User A's edited information because User A's edited information does not include a conflict marker.

As used herein, a file may refer to, for example, a file that includes program code (e.g., C, C++, Java, extensible markup language (XML) code, program code written in a dynamically-typed programming language, program code written in an array-based programming language, a file created using a technical computing environment, a file capable of being compiled, processed, and/or executed by a technical computing environment, etc.), a file in a binary format, a file in a text format, a file in an open packaging convention (OPC) format, a file that includes application data, a file that includes binary data, a file that includes binary application data, an encrypted file, a compressed file, etc. A shared file may refer to, for example, a file that may be accessed and/or edited by multiple users and/or via multiple client devices. An edited file may refer to, for example, a file (e.g., a shared file) that has been edited and/or modified by a user. For example, an edited file may include one or more revisions to a shared file. A conflicted file may refer to, for example, a file that includes multiple revisions (e.g., from different users), which may be identified by a conflict marker.

Figure 2:
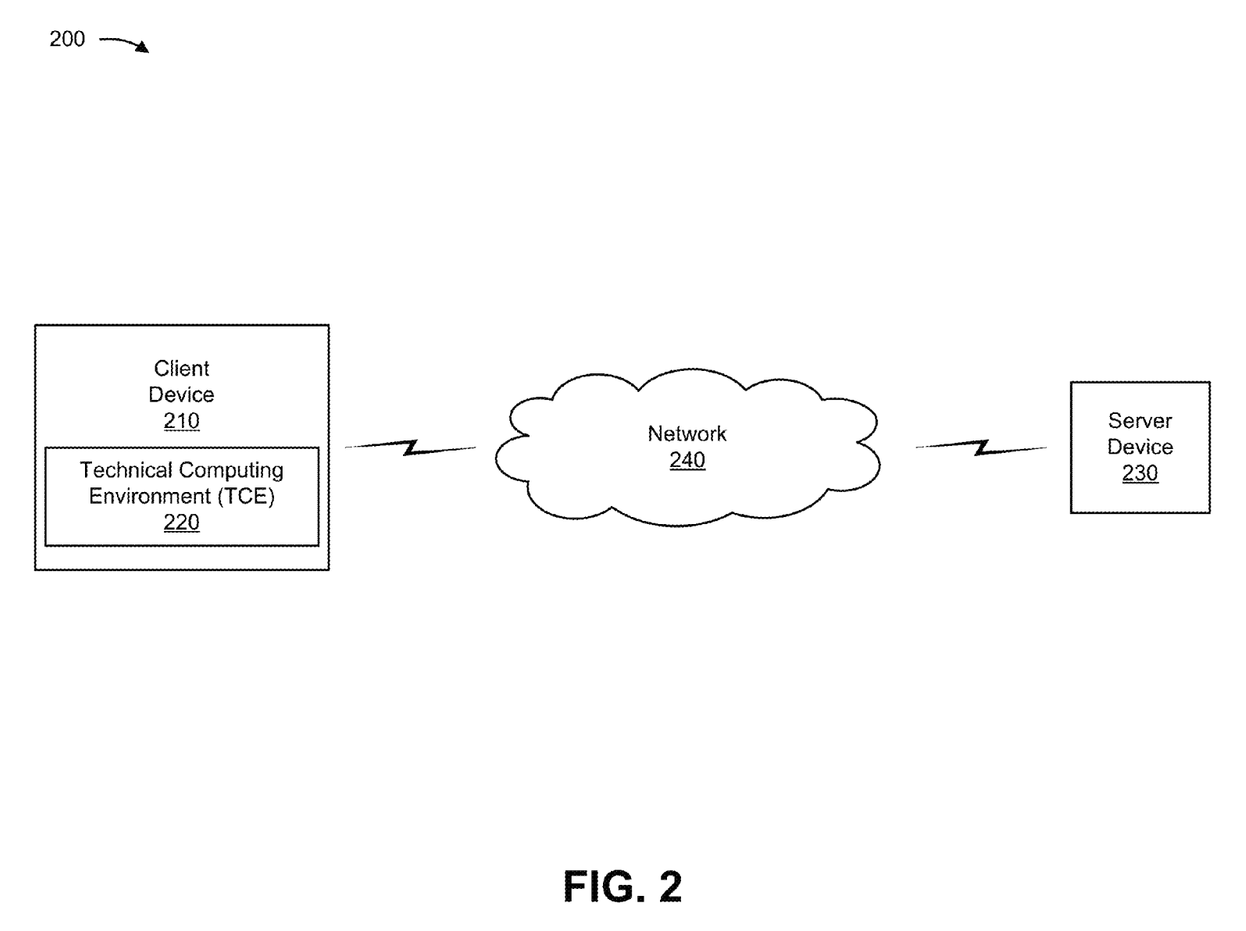
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230 and a network 240. Devices of environment 200 may interconnect via wired connections, wireless connections, or a combination of wired and wireless connections.

Client device 210 may include a device capable of receiving, storing, processing, and/or transmitting information, such as information included in a file. For example, client device 210 may include a computing device (e.g., a desktop computer, a laptop computer, a tablet computer, a handheld computer, a server, etc.), a mobile phone (e.g., a smart phone, a radiotelephone, etc.), or a similar device. In some implementations, client device 210 may receive information (e.g., a file and/or a portion of a file) from and/or transmit information (e.g., a file and/or a portion of a file) to server device 230. Additionally, or alternatively, client device 210 may be capable of parsing a conflicted file, that includes a conflict marker, to determine multiple edits and/or edited information included in the conflicted file and identified by the conflict marker, and may be capable of extracting edited information from the conflicted file.

Client device 210 may host TCE 220. TCE 220 may include any hardware and/or software based logic that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; etc.), or another type of environment, such as a hybrid environment that may include, for example, a text-based environment and a graphically-based environment. TCE 220 may include an application, as described herein, and/or may be used to create an application.

In some implementations, the text-based environment may include a dynamically typed language that may be used to express problems and/or solutions in mathematical notations. For example, the text-based environment may use an array as a basic element, where the array may not require dimensioning. These arrays may be used to support array programming in that operations can apply to an entire set of values, such as values in an array. Array programming may allow array-based operations to be treated as a high-level programming technique or model that lets a programmer think and operate on whole aggregations of data without having to resort to explicit loops of individual non-array, i.e., scalar operations.

Server device 230 may include one or more devices capable of receiving, storing, processing, and/or transmitting information, such as information included in a file. For example, server device 230 may include a computing device, such as a server, a desktop computer, a laptop computer, a tablet computer, a handheld computer, or a similar device. In some implementations, server device 230 may store a shared file, may provide the shared file to client device 210, may receive edits to the shared file from client device 210, and/or may create a conflicted file based on multiple edits received from one or more client devices 210. In some implementations, server device 230 may include a source control tool that keeps track of edits to a shared file by marking up the shared file and the edits with one or more conflict markers, to create a conflicted file.

Network 240 may include one or more wired and/or wireless networks. For example, network 240 may include a cellular network, a public land mobile network ("PLMN"), a second generation ("2G") network, a third generation ("3G") network, a fourth generation ("4G") network, a fifth generation ("5G") network, a long term evolution ("LTE") network, and/or another network. Additionally, or alternatively, network 240 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
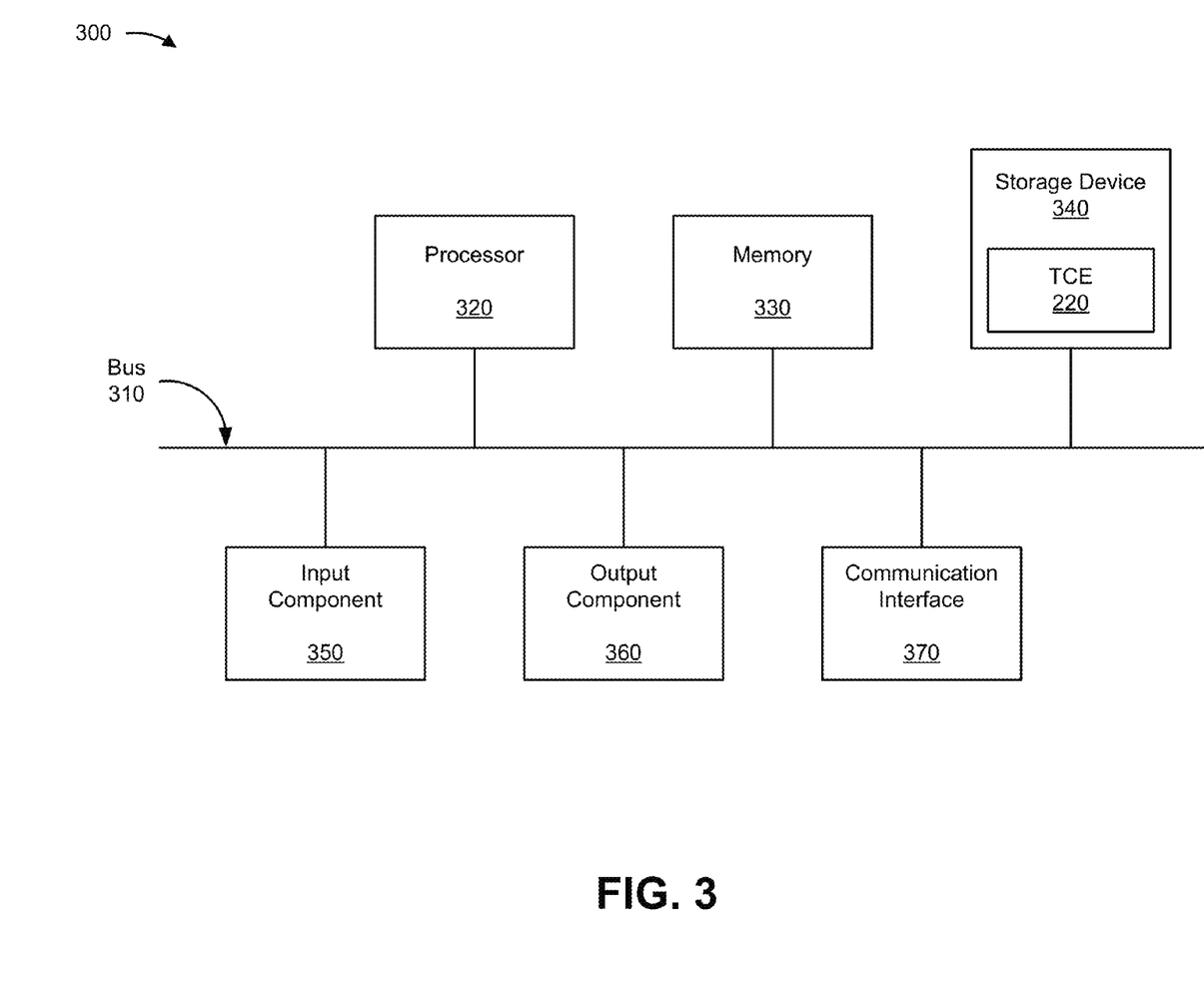
FIG. 3 is a diagram of example components of one or more devices of FIG. 2.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage device 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Storage device 340 may store information and/or software related to the operation and use of device 300. For example, storage device 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage device 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330 and/or storage device 340. A computer-readable medium may be defined as a non-transitory memory device. A memory device may include memory space within a single storage device or memory space spread across multiple storage devices.

Software instructions may be read into memory 330 and/or storage device 340 from another computer-readable medium or from another device via communication interface 370. When executed, software instructions stored in memory 330 and/or storage device 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
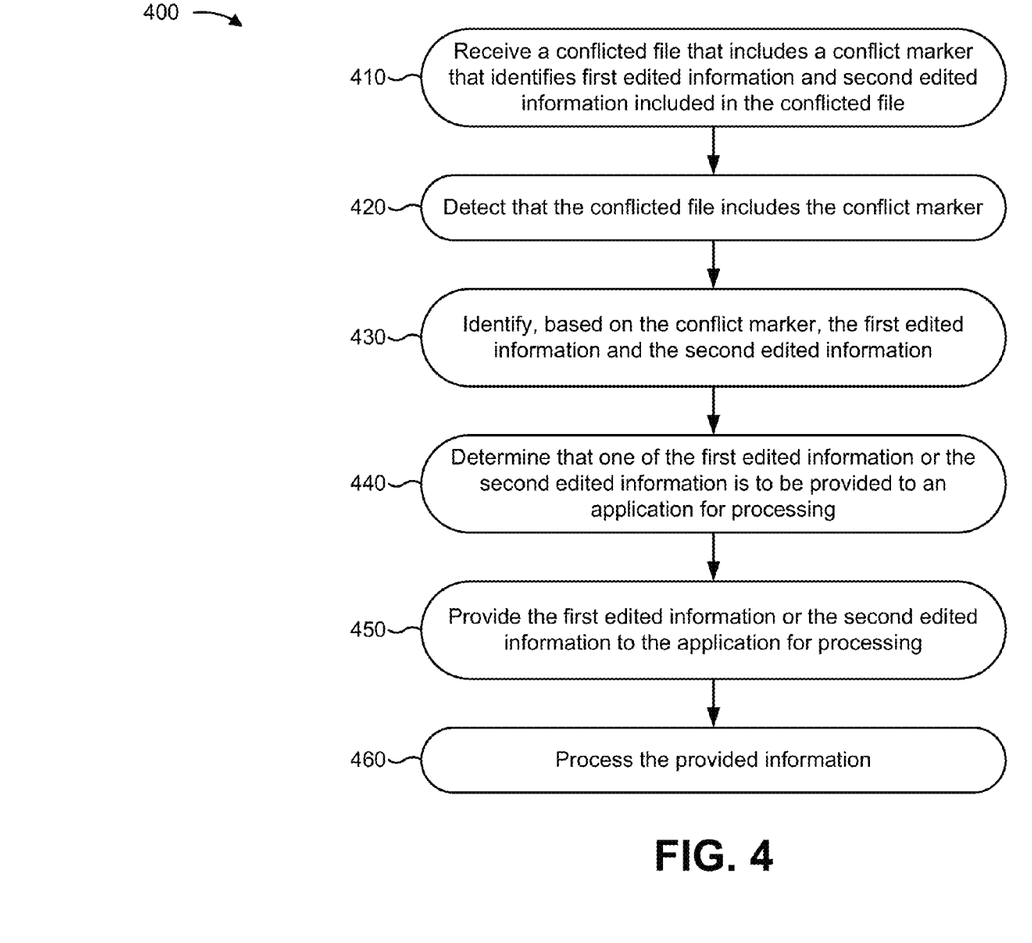
FIG. 4 is a flow chart of an example process for processing a file that includes a conflict marker.

FIG. 4 is a flow chart of an example process 400 for processing a file that includes a conflict marker. In some implementations, one or more process blocks of FIG. 4 may be performed by client device 210. Additionally, or alternatively, one or more process blocks of FIG. 4 may be performed by another device or a group of devices separate from or including client device 210, such as server device 230.

As shown in FIG. 4, process 400 may include receiving a conflicted file that includes a conflict marker that identifies first edited information and second edited information included in the conflicted file (block 410). For example, client device 210 may receive, from server device 230, the conflicted file. Server device 230 may create the conflicted file by incorporating multiple edits into a shared file, and by marking the multiple edits using one or more conflict markers. For example, a first user using a first client device 210 may open the shared file, obtained from server device 230, and a second user using a second client device 210 may open the shared file, obtained from server device 230. The first user and the second user may edit the shared file in a different manner, and may each save the shared file, with the respective edits, to server device 230. In some implementations, the first user and the second user may edit the same portion of the shared file in a different manner and/or may edit portions of the shared file, that depend on one another, in a different manner.

Server device 230 may receive, from the first client device 210, the shared file that includes the first user's edits. Similarly, server device 230 may receive, from the second client device 210, the shared file that includes the second user's edits. Server device 230 may determine that the first user's edits are different from the second user's edits, and may mark up the shared file using one or more conflict markers, to create a conflicted file.

In some implementations, the conflict markers may identify first edited information, such as a portion of the conflicted file that is exclusive to the first user's saved file (e.g., a portion that is not included in the second user's saved file). Additionally, or alternatively, the conflict markers may identify second edited information, such as a portion of the conflicted file that is exclusive to the second user's saved file (e.g., a portion that is not included in the first user's saved file). Additionally, or alternatively, the conflict markers may identify common information, such as a portion of the conflicted file that is included in the first user's saved file and the second user's saved file (e.g., a portion that is the same in both users' saved files). Server device 230 may transmit the conflicted file to client device 210 based on, for example, a request by a user of client device 210 and/or an application running on client device 210.

In some implementations, more than two users may edit a shared file, and the conflict markers may identify edited information from each user. For example, the conflict markers may identify first edited information from a first user, second edited information from a second user, third edited information from a third user, etc., and may identify common information that is common to two or more (e.g., all) users' saved files.

The conflicted file may include content structured according to a structured data format. The structured data format may format the content in a particular manner so that the content may be processed by an application that stores content in the structured data format. For example, the structured data format may include structure elements such as a content hierarchy, hierarchical elements, model configuration data (e.g., information used by the application to create and/or configure a model, such as a block diagram model, from the content), model representation data (e.g., information used by the application to determine a manner in which the content is to be represented in a model, such as a block diagram model), model connection data (e.g., information used by the application to determine how elements of the model, such as blocks identified by the content, are to be connected), port information (e.g., information used by the application to determine input and/or output ports associated with the elements of the model), link information (e.g., information used by the application to determine links between elements of the model), application project-specific information (e.g., label definitions, file metadata entries that reference label definitions and are organized with a hierarchy that mirrors the application project's file system, a project description of the application project, a project shortcut location, etc.), metadata, or the like.

In some implementations, the first edited information, the second edited information, and the common information may be formatting according to the structured data format, and the conflict marker(s) may not be formatted according to the structured data format (e.g., may not comply with the structured data format and/or may violate the structured data format). Additionally, or alternatively, the conflict marker(s) may be formatted according to a different structured data format than the first edited information, the second edited information, and the common information.

As shown in FIG. 4, process 400 may include detecting that the conflicted file includes the conflict marker (block 420), and identifying, based on the conflict marker, the first edited information and the second edited information (block 430). For example, client device 210 may search the conflicted file for a conflict marker. The conflict marker may include a particular string of characters, or two strings of characters. The strings of characters may surround a portion of a file, may appear before a portion of a file identified by the strings of characters, and/or may appear after a portion of a file identified by the strings of characters. Client device 210 may identify the first edited information, the second edited information, and/or common information by parsing and/or searching the conflicted file for one or more conflict markers that identify the first edited information, the second edited information, and/or the common information. For example, client device 210 may parse and/or search the conflicted file for a string(s) of characters that precede, follow, and/or surround a portion of the file corresponding to the first edited information, the second edited information, and/or the common information.

For example, the conflicted file may include the following text:

---
[Common information]
<<<<<<<
[First edited information]
=======
[Second edited information]
>>>>>>>
[Common information].
---

In the above example conflicted file, [Common information] may represent information common to multiple versions of a shared file, [First edited information] may represent information that is unique to a first user's saved version of the shared file, and [Second edited information] may represent information that is unique to a second user's saved version of the shared file. The conflict marker <<<<<<< may indicate an end of a portion of the conflicted file that includes common information, and may indicate a start of a portion of the conflicted file that includes first edited information. The conflict marker ======= may indicate an end to a portion of the conflicted file that includes first edited information, and may indicate a start of a portion of the conflicted file that includes second edited information. The conflict marker >>>>>>> may indicate an end of a portion of the conflicted file that includes second edited information, and may indicate a start of a portion of the conflicted file that includes common information. In some implementations, additional conflict markers may be included in the conflicted file to indicate portions of the conflicted file that include third edited information, fourth edited information, etc. Other sequences of characters may alternatively be used for the conflict marker.

As further shown in FIG. 4, process 400 may include determining that one of the first edited information or the second edited information is to be provided to an application for processing (block 440), and providing the first edited information or the second edited information to the application for processing (block 450). For example, client device 210 may receive a user selection indicating that either the first edited information or the second edited information is to be provided to an application for processing, and may provide the first edited information or the second edited information to the application, based on the user selection.

In some implementations, client device 210 may provide (e.g., via a display) information that assists the user in selecting the first edited information or the second edited information. For example, client device 210 may provide the first edited information and the second edited information on a display. Additionally, or alternatively client device 210 may provide the common information on the display. For example, client device 210 may provide the first user's saved file and the second user's saved file. In some implementations, client device 210 may identify differences between the first user's saved file and the second user's saved file, such as by identifying differences between the first edited information and the second edited information.

In some implementations, when the first edited information includes first program code and the second edited information includes second program code, client device 210 may provide the first and second program code for comparison by a user, and may receive a user selection of the first or second program code to provide to an application. Additionally, or alternatively, client device 210 may provide the first program code and the second program code to the application, which may separately execute the first and second program code. Client device 210 may provide, to the user, the result of executing the first and second program code, and may receive a user selection of the first or second program code. Client device 210 may update the shared file and/or conflicted file to include only the selected program code.

Additionally, or alternatively, client device 210 may provide information associated with the first edited information, the first user's saved file, the second edited information, and/or the second user's saved file, such as a date and/or time that the information was updated or the file was saved, an indication of a most recently saved file, a size of the file, an identification of the user who saved the file or edited the information, an indication of a quantity of errors included in the file (e.g., compilation errors, execution errors, spelling errors, grammar errors, syntax errors, etc.), etc. Client device 210 may receive a user selection of the first edited information or the second edited information based on the provided information.

In some implementations, client device 210 may receive information that identifies a selection criterion, and may determine edited information, to provide to the application, based on the selection criterion. The selection criterion may specify that a file with the oldest or newest save date/time be provided to the application, that a file with the largest or smallest size be provided to the application, that a file saved by a particular user be provided to the application, that a file with the fewest or most errors be provided to the application, that a randomly-selected file be provided to the application, etc. Client device 210 may compare multiple files and/or information, and may determine, based on the comparison and the selection criteria, the file and/or information to provide to the application.

In some implementations, the edited information may include application data and/or binary data (e.g., information provided in a binary format, such as a series of ones and zeroes). Client device 210 may provide the edited information to the application as an input stream, such as an input stream of binary numbers, text, program code, numbers, strings and/or characters.

As shown in FIG. 4, process 400 may further include processing the provided information (block 460). In some implementations, client device 210 may process the provided information (e.g., the provided first edited information or the provided second edited information) using an application running on client device 210. Processing the provided information may include compiling and/or executing the provided information (e.g., program code, application data, binary data, etc.) to produce a result, manipulating the provided information in some manner, etc. In some implementations, the compiled, executed, and/or manipulated information may be provided, via a user interface of client device 210, to a user.

While a series of blocks has been described with regard to FIG. 4, the blocks and/or the order of the blocks may be modified in some implementations. Additionally, or alternatively, non-dependent blocks may be performed in parallel.

Figure 5:
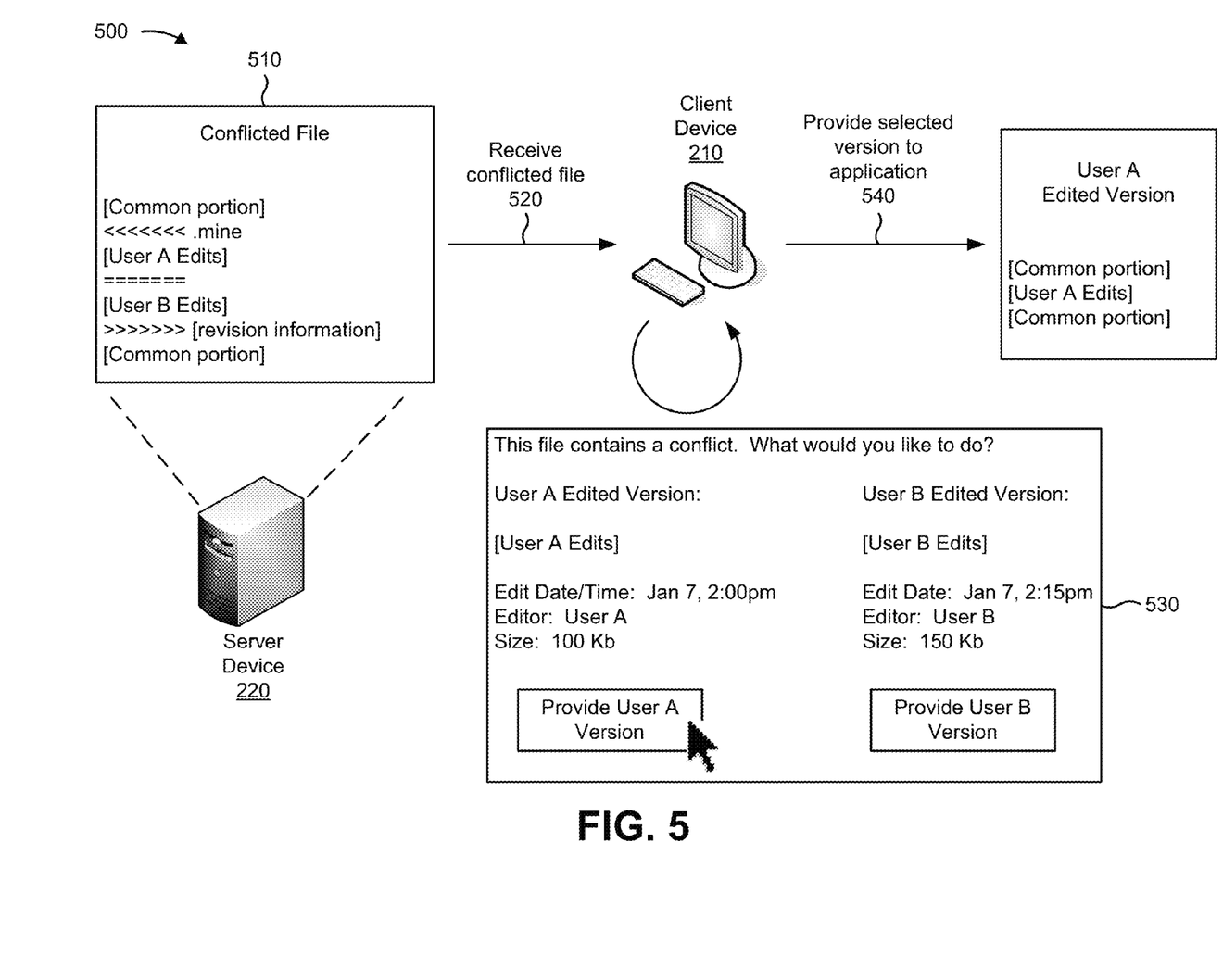
FIG. 5 is a diagram of an example implementation relating to the example process shown in FIG. 4.

FIG. 5 is a diagram of an example implementation 500 relating to example process 400 (FIG. 4). In example implementation 500, assume that users A and B have edited a shared file to create a conflicted file 510 (e.g., via the technique shown in FIG. 1A).

Conflicted file 510 may include a conflict marker that identifies information edited by multiple users. In some implementations, the conflict marker may include syntax used by a source or revision control tool, such as Git or Subversion (svn). For example, conflicted file 510 may include the following text:

---

[Common portion]
<<<<<<< .mine
[User A Edits]
=======
[User B Edits]
>>>>>>> [revision information]
[Common portion].

---

In conflicted file 510, [Common portion] may represent information (e.g., text, numbers, program code, binary code, etc.) included in both user A's edited version of the shared file and user B's edited version of the shared file, [User A Edits] may represent information included only in user A's edited version of the shared file, and [User B Edits] may represent information included only in user B's edited version of the shared file. The conflict marker syntax <<<<<<< .mine may appear before [User A Edits], and the conflict marker syntax ======= may appear after [User A Edits] in conflicted file 510. Similarly, the conflict marker syntax ======= may appear before [User B Edits], and the conflict marker syntax >>>>>>> [revision information] may appear after [User B Edits] in conflicted file 510. The [revision information] may represent information that identifies a version of the shared file that was most recently saved.

As shown by reference number 520, client device 210 may receive conflicted file 510. For example, conflicted file 510 may be intended for processing via an application running on client device 210. Client device 210 may process conflicted file 510 prior to providing conflicted file 510 to the application. When processing conflicted file 510, client device 210 may determine that conflicted file 510 includes a conflict (e.g., identified by a conflict marker). For example, client device 210 may parse and/or search conflicted file 510 to identify a conflict marker, such as by searching for the conflict marker syntax <<<<<<<, <<<<<<< . mine, =======, >>>>>>>, and/or >>>>>>> [revision information]. Additionally, or alternatively, client device 210 may determine edited information, included in conflicted file 510, to provide to the application.

In some implementations, client device 210 may provide information associated with the edited information included in conflicted file 510, as shown by user interface 530. For example, client device 210 may provide information that identifies the edited information (e.g., [User A Edits] and [User B Edits]), the date/time at which the edited information was edited and/or saved, an editor of the edited information, a size of the edited information or the file that includes the edited information (e.g., user A's edited file, user B's edited file), etc. In some implementations, client device 210 may provide, via user interface 530, a side-by-side comparison of the edited information, and may highlight differences between the edited information (e.g., first edited information and second edited information). Client device 210 may receive, via user interface 530, a user selection of a file version to provide to the application.

Additionally, or alternatively, client device 210 may provide a notification to a user, indicating that corrective action should be taken before the file can be provided to the application. The user may take corrective action, such as by resolving any conflicts by saving an updated revision of the shared file, merging first edited information and second edited information into a shared file, and/or removing any conflict markers from the conflicted file. The user may provide input to client device 210 indicating that the conflict has been resolved and/or the conflict marker has been removed.

As shown by reference number 540, client device 210 may provide the selected file version to the application for processing (e.g., compiling, execution, etc.). Additionally, or alternatively, client device 210 may separately provide multiple versions of the shared file to the application. The user may be permitted to interact with the multiple versions, and to select a version to be saved as the shared file. The conflicts associated with the unselected versions may be removed from the shared file and/or the conflicted file.

In some implementations, client device 210 may store information that identifies the selected version and/or information associated with the selected version. For example, client device 210 may associate the selected version with a user that selected the selected version. When the user opens and/or runs the conflicted file for processing, client device 210 may determine that the user is associated with a particular version, and may provide the particular version to the application for processing.

Figure 6:
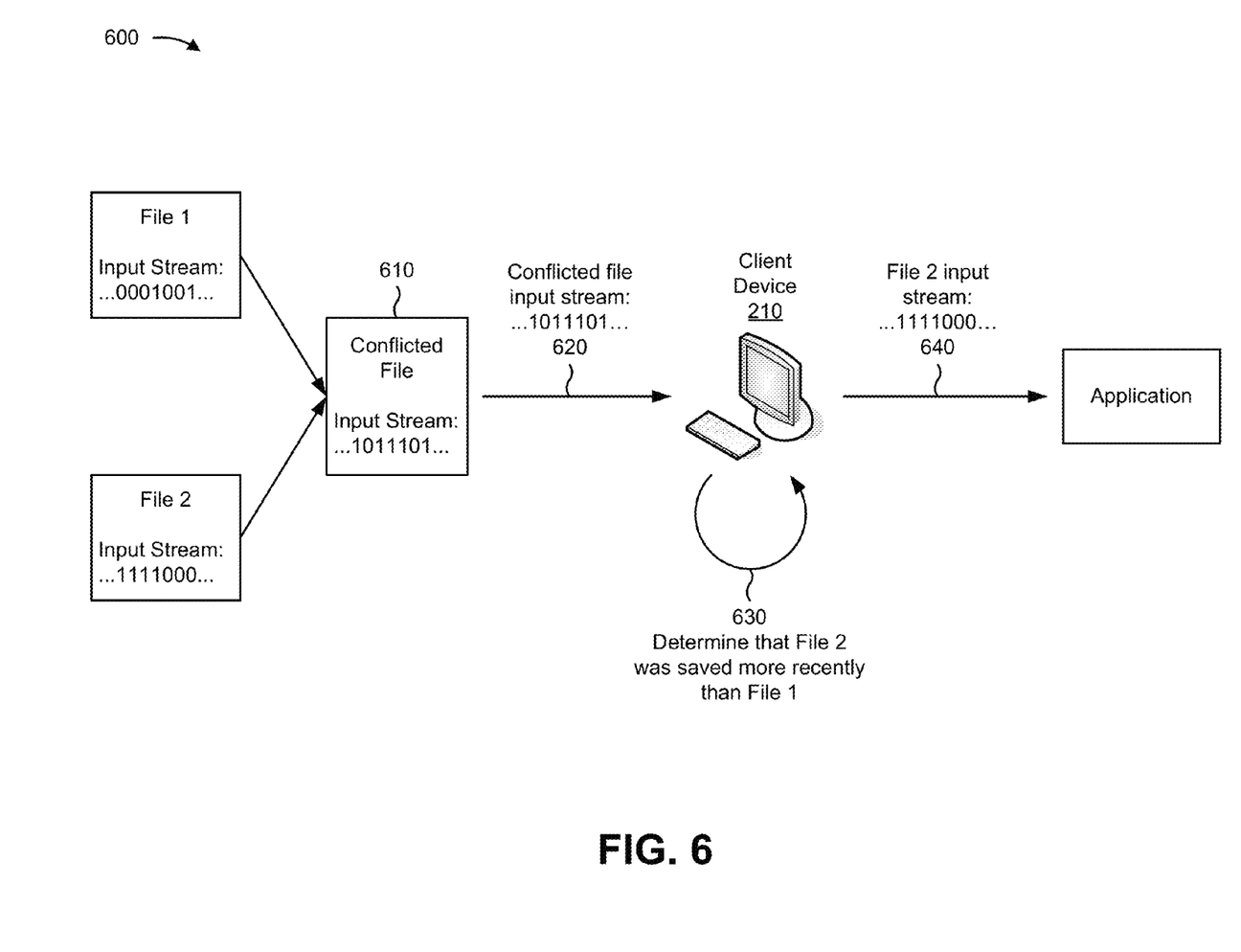
FIG. 6 is a diagram of another example implementation relating to the example process shown in FIG. 4.

FIG. 6 is a diagram of an example implementation 600 relating to example process 400 (FIG. 4). In example implementation 600, assume that a first user has edited a shared file to include first edited information included in file 1, such as input stream . . . 0001001 . . . , where the ellipses (" . . . ") represent binary code common to files 1 and 2, and 0001001 represents first edited information (e.g., binary code) unique to file 1. Further assume that a second user has edited the shared file to include second edited information included in file 2, such as input stream . . . 1111000 . . . , where the ellipses (" . . . ") represent binary code common to files 1 and 2, and 1111000 represents second edited information (e.g., binary code) unique to file 2.

Further assume that client device 210 and/or server device 230 has combined file 1 and file 2 to create conflicted file 610. Conflicted file 610 may include input stream . . . 1011101 . . . , where the ellipses (" . . . ") represent binary code common to files 1 and 2, and 1011101 represents conflict marker syntax and/or the edited information unique to files 1 and 2.

As shown by reference number 620, client device 210 may receive conflicted file 610, and may receive the conflicted file input stream ( . . . 1011101 . . . ). For example, an application on client device 210 may attempt to run conflicted file 610, but may be unable to process the conflicted file input stream. Client device 210 may process conflicted file 610 prior to conflicted file 610 being provided to the application. When processing conflicted file 610, client device 210 may determine that conflicted file 610 includes a conflict (e.g., identified by a conflict marker). For example, client device 210 may parse and/or search conflicted file 610 to identify a conflict marker, such as by searching for a particular series of binary code (1s and 0s).

As shown by reference number 630, client device 210 may use a selection criterion to determine a binary input stream to provide to the application. For example, client device 210 may determine that file 2 was saved and/or created more recently than file 1, and may provide the file 2 input stream ( . . . 1111000 . . . ) to the application, as shown by reference number 640.

Figure 7A:
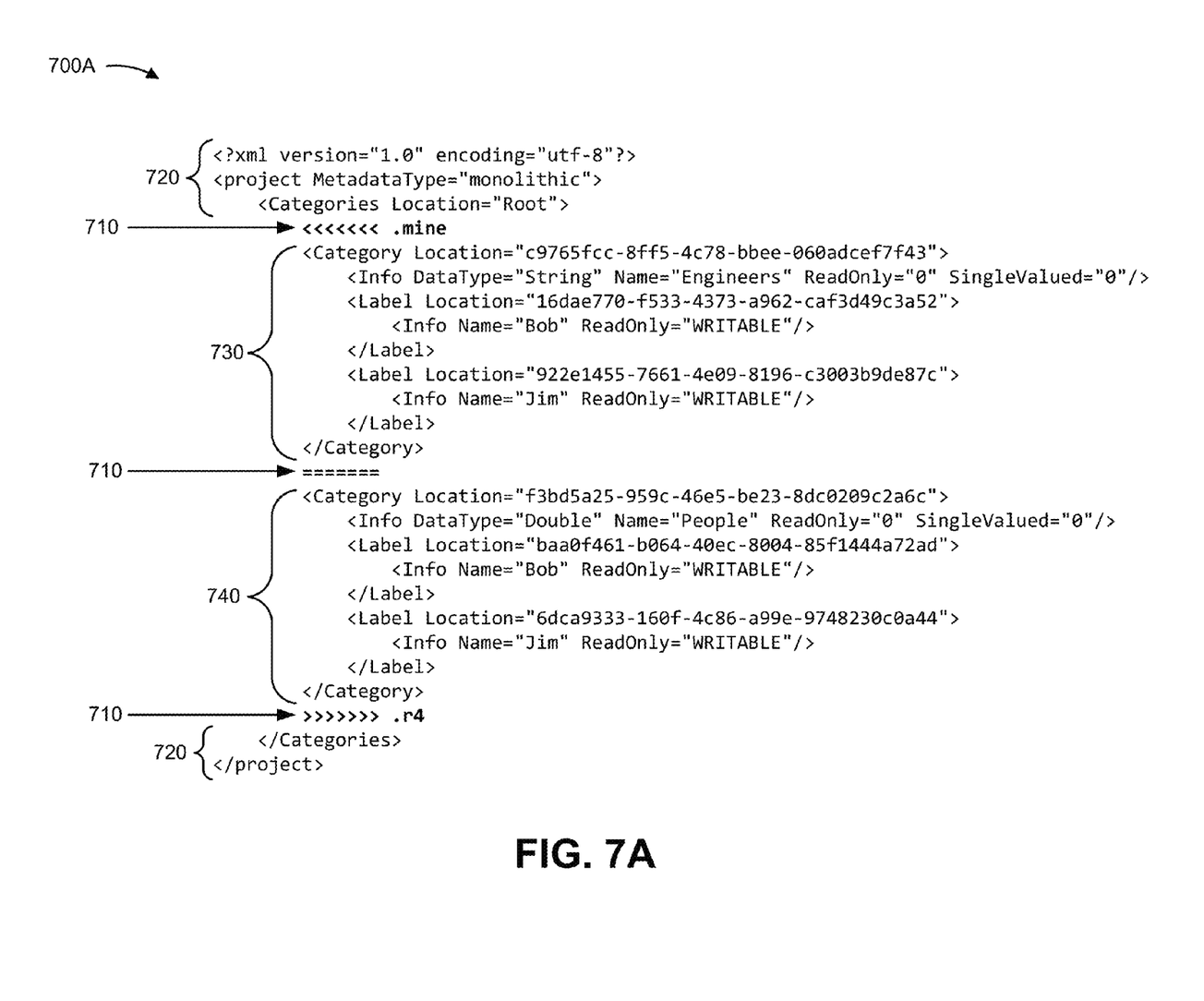
FIGS. 7A-7C are diagrams of yet another example implementation relating to the example process shown in FIG. 4.
Figure 7B:
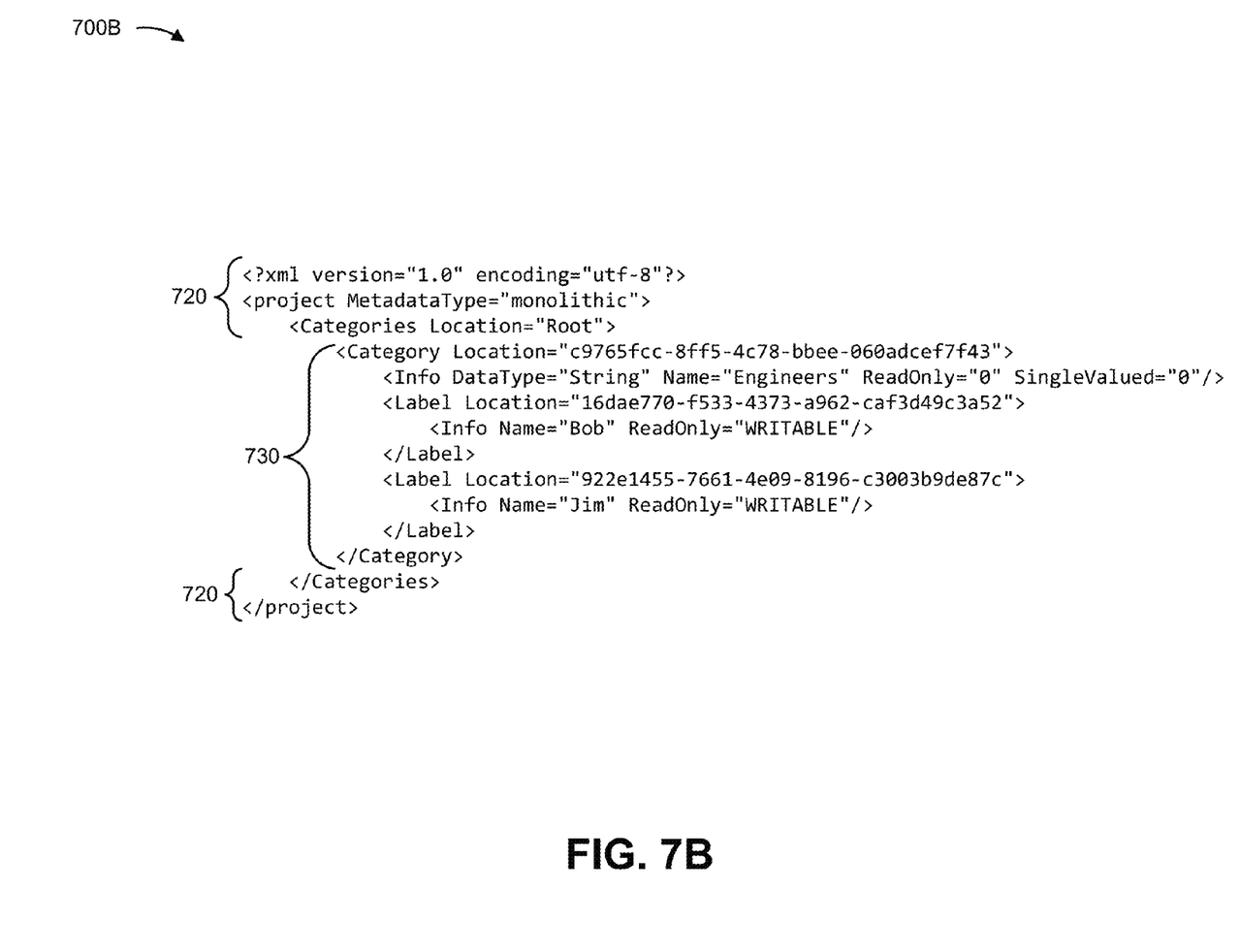
Figure 7C:
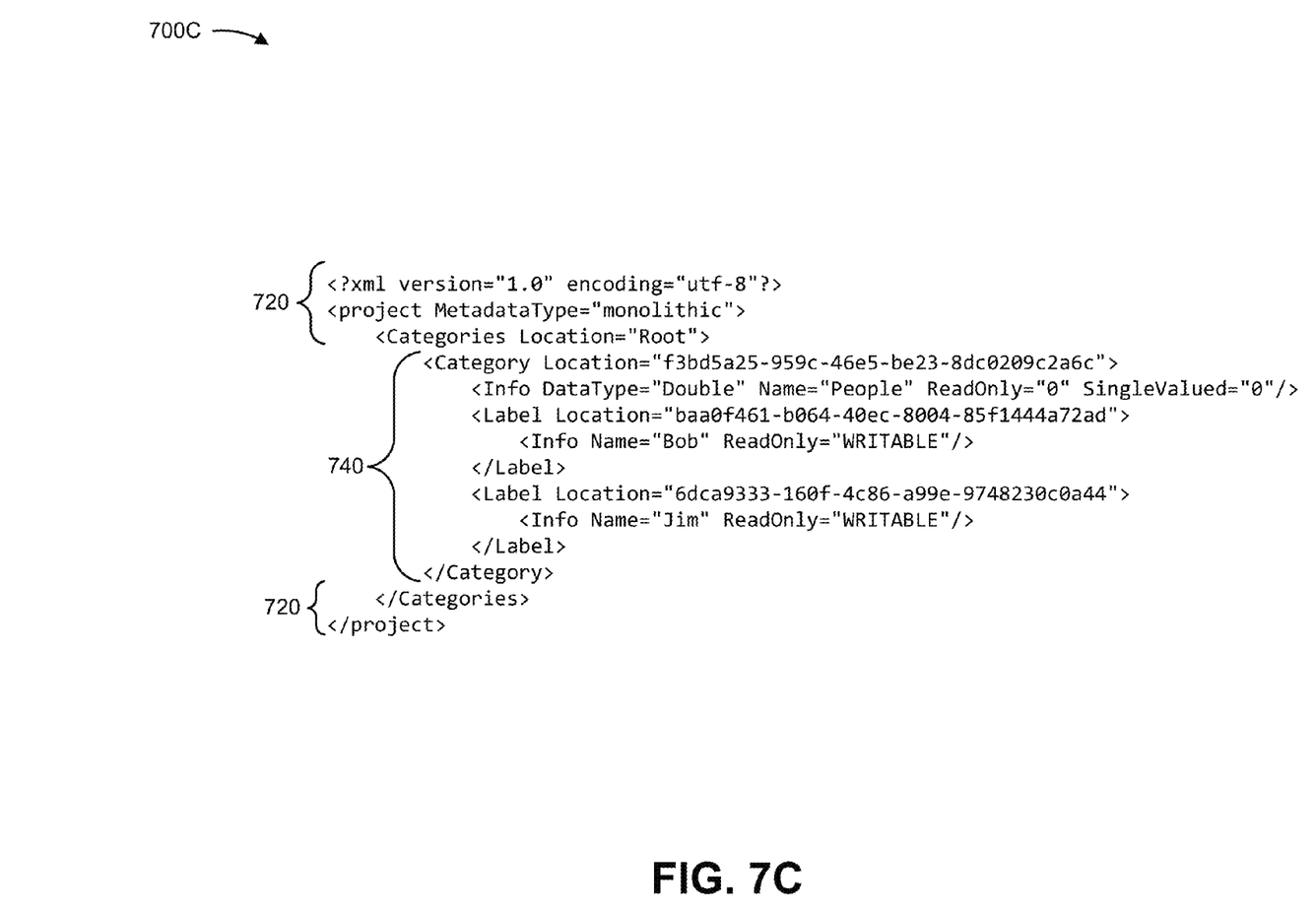

FIGS. 7A-7C are diagrams of example implementations 700A-700C relating to example process 400 (FIG. 4). FIGS. 7A-7C show application data in a structured format. FIG. 7A shows application data in a conflicted file that includes a conflict marker that does not comply with the structured application data format. FIGS. 7B and 7C show application data, derived from the conflicted file, that complies with the structured application data format.

As shown in FIG. 7A, a conflicted file may include application data in a structured format, such as an extensible markup language (XML) format. The conflicted file may include conflict markers 710, which may differentiate common information 720, first edited information 730, and second edited information 740. Client device 210 may receive the conflicted file, and may identify common information 720, first edited information 730, and second edited information 740 based on conflict markers 710.

As shown in FIG. 7B, client device 210 may create a first file that includes application data that complies with the structured application data format. For example, client device 210 may remove conflict markers 710 from the first file, and may include common information 720 and first edited information 730 in the first file. Client device 210 may provide the first file (e.g., a data structure and/or structured information) to an application for processing the application data. The application may process the application data because the application data complies with the structured application data format.

Similarly, as shown in FIG. 7C, client device 210 may create a second file that includes application data that complies with the structured application data format. For example, client device 210 may remove conflict markers 710 from the second file, and may include common information 720 and second edited information 740 in the second file. Client device 210 may provide the second file to the application for processing the application data. The application may process the application data because the application data complies with the structured application data format.

In some implementations, client device 210 may provide first edited information 730 and second edited information 740 to a user, and may receive a user selection of first edited information 730 or second edited information 740. Client device 210 may provide the selected information to an application for processing. The application may process the selected information, and may return a result of processing the selected information.

The foregoing disclosure provides illustration and description, but is not intended to be exhaustive or to limit the implementations to the precise form disclosed. Modifications and variations are possible in light of the above disclosure or may be acquired from practice of the implementations.

Example conflict markers have been described herein. Some implementations described herein may utilize additional conflict markers, different conflict markers, and/or differently arranged conflict markers than those described herein. For example, a conflict marker may include any character (e.g., an ASCII character) or any string of characters.

Some implementations have been described herein with respect to first edited information and second edited information. Some implementations may include more than two different versions of edited information (e.g., third edited information, fourth edited information, etc.).

As used herein, component is intended to be broadly construed as hardware, firmware, or a combination of hardware and software.

As used herein, program code is to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, program code may include different combinations of the above-identified classes (e.g., text-based code, binary code, text files, etc.). Additionally, or alternatively, program code may include code generated using a dynamically-typed programming language (e.g., the M language, a MATLAB® language, a MATLAB-compatible language, a MATLAB-like language, etc.) that can be used to express problems and/or solutions in mathematical notations. Additionally, or alternatively, program code may be of any type, such as a function, a script, an object, etc., and a portion of program code may include one or more characters, lines, etc. of the program code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
receive a conflicted file, with a structured data format associated with an application running on the device, that includes a conflict marker that does not comply with the structured data format,
the structured data format including at least one of:
a hierarchical element,
model configuration data,
model representation data,
model connection data,
port information,
link information, or
project-specific information,
the conflicted file being received from a server and including program code,
the conflict marker being different than the program code, the conflict marker, included in the conflicted file, rendering the application unable to process the conflicted file, the conflict marker identifying first edited information, complying with the structured data format, and second edited information, complying with the structured data format, included in the conflicted file;

detect that the conflicted file includes the conflict marker;

identify, based on detecting that the conflicted file includes the conflict marker, the first edited information and the second edited information;

determine that at least one of the first edited information or the second edited information is to be provided to the application based on a selection criterion associated with the first edited information and the second edited information, the selection criterion including:

information identifying a user that edited a shared file to obtain the first edited information or the second edited information, or a size associated with the first edited information or the second edited information; and provide, based on the determining, the first edited information or the second edited information to the application for processing.

2. The device of claim 1, where the first edited information and the second edited information include at least one of:
application data;
binary data; or
binary application data.

3. The device of claim 1, where the first edited information and the second edited information have been modified in different versions of the shared file to create the conflicted file, and
where the conflict marker further identifies common information, complying with the structured data format, that is common to the different versions of the shared file; and
where the one or more processors are further to:
provide the common information to the application for processing.

4. The device of claim 1, where the one or more processors, when determining that at least one of the first edited information or the second edited information is to be provided to the application, are to:
receive a first result of the application processing the first edited information;
receive a second result of the application processing the second edited information;
provide, via a user interface, first result information that identifies the first result and second result information that identifies the second result;
receive a user selection of one of the first result information or the second result information; and
determine that the one of the first edited information or the second edited information is to be provided to the application for processing, based on the user selection.

5. The device of claim 1, where the one or more processors, when determining that at least one of the first edited information or the second edited information is to be provided to the application, are to:
receive the selection criterion associated with the first edited information and the second edited information;
compare the first edited information and the second edited information, based on the selection criterion; and where the one or more processors, when providing the first edited information or the second edited information to the application, are further to:
provide the first edited information or the second edited information to the application, based on:
comparing the first edited information and the second edited information, and the selection criterion.

6. The device of claim 5, where the selection criterion further includes:
a time associated with the first edited information or the second edited information.

7. The device of claim 1, where the one or more processors, when receiving the conflicted file, are to receive the conflicted file as a first input stream, and
where the one or more processors, when providing the first edited information or the second edited information to the application for processing, are to provide the first edited information or the second edited information as a second input stream.

8. A non-transitory computer-readable medium storing instructions, the instructions comprising:
one or more instructions that, when executed by a processor of a device, cause the processor to:
receive a conflicted file that includes a first conflict marker, that identifies first edited information included in the conflicted file, and a second conflict marker, that identifies second edited information included in the conflicted file,
the conflicted file including program code,
the conflict marker being different than the program code,
the first edited information and the second edited information being in a structured format associated with an application running on the device,
the first conflict marker and the second conflict marker violating the structured format,
the structured format including at least one of:
a hierarchical element,
model configuration data,
model representation data,
model connection data,
port information,
link information, or
project-specific information,
the first edited information including first program code of the program code and the second edited information including second program code of the program code,
the application being unable to process the conflicted file based on the conflicted file including the first conflict marker and the second conflict marker that violate the structured format;
detect that the conflicted file includes the first conflict marker and the second conflict marker;
identify, based on detecting that the conflicted file includes the first conflict marker and the second conflict marker, the first edited information, based on the first conflict marker, and the second edited information, based on the second conflict marker;
determine that at least one of the first edited information or the second edited information is to be provided to the application based on a selection criterion associated with the first edited information and the second edited information, the selection criterion including:
information identifying a user that edited a shared file to obtain the first edited information or the second edited information, or
a size associated with the first edited information or the second edited information; and
provide, based on determining that the at least one of the first edited information or the second edited information is to be provided to the application, the first edited information or the second edited information to the application for processing.

9. The non-transitory computer-readable medium of claim 8, where, when processing the first edited information, the application executes the first program code, and
where, when processing the second edited information, the application executes the second program code.

10. The non-transitory computer-readable medium of claim 8, where the first edited information and the second edited information have been modified, in different versions of the shared file, to create the conflicted file, and
where the first conflict marker and the second conflict marker further identify common information, in the structured format, that is common to the different versions of the shared file; and
where the one or more instructions further cause the processor to:
provide the common information to the application for processing.

11. The non-transitory computer-readable medium of claim 8, where the one or more instructions, that cause the processor to determine that at least one of the first edited information or the second edited information is to be provided to the application, cause the processor to:
receive a first result of the application processing the first edited information;
receive a second result of the application processing the second edited information;
provide, via a user interface, first result information that identifies the first result and second result information that identifies the second result;
receive a user selection of one of the first result information or the second result information; and
determine that one of the first edited information or the second edited information is to be provided to the application, based on the user selection.

12. The non-transitory computer-readable medium of claim 8, where the one or more instructions, that cause the processor to determine that at least one of the first edited information or the second edited information is to be provided to the application, cause the processor to:
receive the selection criterion associated with the first edited information and the second edited information;
compare the first edited information and the second edited information, based on the selection criterion; and
where the one or more instructions, that cause the processor to provide the first edited information or the second edited information to the application, further cause the processor to:
provide the first edited information or the second edited information to the application, based on:
comparing the first edited information and the second edited information, and the selection criterion.

13. The non-transitory computer-readable medium of claim 8, where the selection criterion further includes:
a time associated with the first edited information or the second edited information.

14. The non-transitory computer-readable medium of claim 8, where the one or more instructions, that cause the processor to receive the conflicted file, cause the processor to receive the conflicted file as a first input stream, and
where the one or more instructions, that cause the processor to provide the first edited information or the second edited information, cause the processor to provide the first edited information or the second edited information as a second input stream to the application.

15. A method, comprising:
receiving, from a server, a conflicted file that includes a conflict marker, in a first structured data format, that identifies first edited information and second edited information included in the conflicted file,
the conflicted file including program code,
the first edited information and the second edited information being in a second structured data format associated with an application running on a device,
the second structured data format including at least one of:
a hierarchical element,
model configuration data,
model representation data,
model connection data,
port information,
link information, or
project-specific information,
the application being unable to process the conflicted file based on the conflicted file including the conflict marker in the first structured data format,
the first edited information including first program code of the program code and the second edited information including second program code of the program code,
the receiving the conflicted file being performed by flail the device;
detecting that the conflicted file includes the conflict marker,
the detecting being performed by the device,
the conflict marker being included in the program code;
identifying, based on detecting that the conflicted file includes the conflict marker, the first edited information and the second edited information,
the identifying being performed by the device;
determining that at least one of the first edited information or the second edited information is to be provided to the application for processing based on a selection criterion associated with the first edited information and the second edited information,
the selection criterion including:
information identifying a particular user that edited a shared file to obtain the first edited information or the second edited information, or
a size associated with the first edited information or the second edited information,
the determining being performed by the device;
providing, based on the determining, the first edited information or the second edited information to the application for processing,
the providing being performed by the device; and
processing, via the application, the provided first edited information or the second edited information,
the processing being performed by the device.

16. The method of claim 15, where the first edited information and the second information include at least one of:
- application data;
- binary data; or
- binary application data.

17. The method of claim 15, where the first edited information and the second edited information have been modified in different versions of the shared file to create the conflicted file, and
- where the conflict marker further identifies common information, in the second structured data format, that is common to the different versions of the shared file; and
- the method further comprising:
  - providing the common information to the application for processing.

18. The method of claim 15, where determining that at least one of the first edited information or the second edited information is to be provided to the application comprises:
- receiving a first result of the application processing of the first edited information;
- receiving a second result of the application processing of the second edited information;
- providing, via a user interface, first result information that relates to the first result and second result information that relates to the second result;
- receiving a user selection of one of the first result information or the second result information; and
- determining that one of the first edited information or the second edited information is to be provided to the application for processing, based on the user selection.

19. The method of claim 15, where determining that at least one of the first edited information or the second edited information is to be provided to the application comprises:
- receiving the selection criterion associated with the first edited information and the second edited information;
- comparing the first edited information and the second edited information, based on the selection criterion; and
- where providing the first edited information or the second edited information to the application further comprises:
  - providing the first edited information or the second edited information to the application, based on:
    - comparing the first edited information and the second edited information, and
    - the selection criterion.

20. The method of claim 15, further comprising:
providing for display:
- information identifying a first user that edited the shared file to obtain the first edited information, a size associated with the first edited information, and at least one of a date or a time associated with the first user editing the shared file, and
- information identifying a second user that edited the shared file to obtain the second edited information, a size associated with the second edited information, and at least one of a date or a time associated with the second user editing the shared file.

* * * * *